United States Patent
Debert et al.

(10) Patent No.: US 10,214,135 B2
(45) Date of Patent: Feb. 26, 2019

(54) VEHICLE LIGHT DEVICE WITH AN OPTICAL ELEMENT PINNED WITH A FLEXIBLE BRACING ELEMENT

(71) Applicant: VALEO VISION BELGIQUE, Meslin l'Eveque (BE)

(72) Inventors: Florestan Debert, Meslin l'Eveque (BE); Dirkie Sacchet, Meslin l'Eveque (BE); Franck Dinant, Meslin l'Eveque (BE)

(73) Assignee: VALEO VISION BELGIQUE, Meslin-l'Eveque (BE)

( * ) Notice: Subject to any disclaimer, the term of this patent is extended or adjusted under 35 U.S.C. 154(b) by 0 days.

(21) Appl. No.: 15/634,538

(22) Filed: Jun. 27, 2017

(65) Prior Publication Data
US 2017/0368980 A1    Dec. 28, 2017

(30) Foreign Application Priority Data

Jun. 28, 2016   (FR) ...................................... 16 56010

(51) Int. Cl.
| F21V 17/02 | (2006.01) |
| B60Q 1/068 | (2006.01) |

(Continued)

(52) U.S. Cl.
CPC ............. B60Q 1/0683 (2013.01); B60Q 1/20 (2013.01); F21S 41/141 (2018.01); F21S 41/28 (2018.01);
(Continued)

(58) Field of Classification Search
CPC ....... B60Q 1/0683; B60Q 1/20; F21S 41/161; F21S 41/143; F21S 41/28; F21S 41/285;
(Continued)

(56) References Cited

U.S. PATENT DOCUMENTS

| 2012/0257400 A1 | 10/2012 | Shibata | |
| 2015/0184819 A1* | 7/2015 | Maliar | ................ F21S 48/1721 |
| | | | 362/512 |
| 2016/0084470 A1* | 3/2016 | Abe | ...................... F21S 41/143 |
| | | | 362/549 |

FOREIGN PATENT DOCUMENTS

| EP | 2 508 795 A2 | 10/2012 |
| EP | 2 998 644 A1 | 3/2016 |

(Continued)

OTHER PUBLICATIONS

French Preliminary Search Report dated Jan. 24, 2017 in French Application 16 56010 filed on Jun. 28, 2016 (with English Translation of Categories of Cited Documents).

*Primary Examiner* — Ali Alavi
(74) *Attorney, Agent, or Firm* — Oblon, McClelland, Maier & Neustadt, L.L.P.

(57) ABSTRACT

The present invention relates to a motor vehicle light device that includes an optical deflector, at least one bearing element, and a pinning element. The pinning element has a bracing element bearing a contact portion, the bracing element at least partially surrounding the optical deflector, the contact portion bearing against the optical deflector. The optical deflector, the bearing element and the pinning element are arranged so that the optical deflector is at least partially gripped between the bearing piece and the contact portion, so that, in a direction running from the bearing piece to the contact portion, the contact portion is rigid and the bracing element is elastically deformable.

20 Claims, 4 Drawing Sheets

(51) Int. Cl.
    *F21S 41/20*     (2018.01)
    *F21S 41/63*     (2018.01)
    *F21S 41/141*     (2018.01)
    *B60Q 1/20*     (2006.01)
    *F21S 41/29*     (2018.01)
    *F21Y 115/10*     (2016.01)
    *F21S 41/143*     (2018.01)

(52) U.S. Cl.
    CPC ........... *F21S 41/285* (2018.01); *F21S 41/295* (2018.01); *F21S 41/635* (2018.01); *F21S 41/143* (2018.01); *F21Y 2115/10* (2016.08)

(58) Field of Classification Search
    CPC .... F21S 41/295; F21S 41/635; F21S 48/1723; F21S 48/1233; F21S 48/1225; F21S 48/115
    See application file for complete search history.

(56) References Cited

FOREIGN PATENT DOCUMENTS

| | | |
|---|---|---|
| FR | 3 026 462 A1 | 4/2016 |
| WO | WO 2014/012878 A1 | 1/2014 |

\* cited by examiner

VEHICLE LIGHT DEVICE WITH AN OPTICAL ELEMENT PINNED WITH A FLEXIBLE BRACING ELEMENT

The present invention relates to a light device, notably of a motor vehicle. More particularly, the present invention relates to a road lighting device, notably a foglight.

In vehicle light devices, it is important for the light beam to observe certain spatial light intensity distribution characteristics. For example, some headlights have to be able to produce a light beam delimited by a cutoff line at a certain level above the roadway.

For that, an accurate positioning of the optical element deflecting the light rays emitted by the light source of these devices, so as to form the desired light beam, is required. The optical element is even called optical deflector.

For example, in different known headlights, the optical element and the light source are fixed directly or indirectly to the housing. This is notably the case in the foglights where the lamp is fixed at the back of the housing and where the reflector is fixed to the housing via a cradle.

Such headlights therefore have a number of elements in contact between the optical element and the light source whose rays they deflect. These different contacts are just so many tolerances to be taken into account upon designing the headlight. The more of them there are, the more difficult it will be to produce these headlights.

The technical problem that the invention aims to resolve is therefore to simplify the production of vehicle light devices, given the tolerances between the light source and the optical element which deflects its rays.

To this end, a first subject of the invention is a motor vehicle light device intended to comprise a light source, said light device comprising:
  an optical deflector arranged to deflect the light rays emitted by the light source,
  at least one bearing element,
  a pinning element comprising a bracing element and at least one contact portion borne by the bracing element, the bracing element at least partially surrounding the optical deflector, this contact portion bearing against the optical deflector,
the optical deflector, the bearing element and this pinning element being arranged so that the optical deflector is at least partially gripped between this bearing element and this contact portion, and so that, in a direction passing through this contact portion, called direction of flexing, this contact portion is rigid and the bracing element is deformable, preferably elastically deformable.

According to the invention, by deformable it is meant that the bracing element deforms or bends without breaking under a urging force along the direction of flexing. The bracing element is thus flexible. The shape and the material of the bracing element are defined so as to remain in a domain less or equal to 200% of the yield point of the part. In a first embodiment, the material of the bracing element does not contain fibers, and the deformation range can extend to 200% of the yield point. Preferably, the applied deformation is in the elastic range that means that the applied deformation is beyond or equal 100% of the elastic limit, and that the bracing element takes again its initial shape when the urging force is not more applied.
In a second embodiment, the material of the bracing element contains fibers and the deformation range will be restrained to the elastic range.

In opposition, the contact portion is defined as rigid because it does not bear any deformation when the same urging force than the one applied to the deformable bracing element is applied.

Thus, the tolerance defects between the optical deflector, the bearing element and the pinning element, are absorbed by the bracing element of the pinning element, in particular the tolerances relative to the housing.

This direction of flexing can notably be directed toward the front of the light device, notably at right angles to a pivoting axis of the optical deflector.

According to one embodiment of the invention, the bearing element is an adjusting screw. That can for example make it possible to absorb the tolerance defects between the optical deflector and the adjusting screw and/or avoid an excessive load on this screw upon a movement of the optical deflector.

According to one embodiment of the invention, the bearing element is a support of the optical deflector. That makes it possible to absorb the tolerance defects between the optical deflector, its support and the pinning element.

These two preceding embodiments can be combined.

For example, according to one embodiment of the invention, the light device comprises two bearing elements, one being an adjusting screw and the other the support of the optical deflector. In this embodiment, the bracing element thus grips the optical deflector between, on the one hand, the support thereof and, on the other hand, the adjusting screw.

The invention, and/or the embodiments seen above, can optionally have one or more of the following features:
  the pinning element is a mask placed in front of the bearing element in the direction of emission of the light beam by the light device; such a mask makes it possible to conceal the cables, the bottom of the housing or other elements of purely functional forms from the sight of an observer outside the light device; by using this piece as pinning element, there is no need to have an additional piece, which represents a weight and material saving;
  the bracing element is a trim of the mask, the trim being visible from the outside of said light device and having a central opening through which the light rays emitted by the light source passes, after or before deflection by the optical deflector; the mask is thus a piece that is simple to produce;
  the bracing element and the contact portion or portions are made of a single piece of material; that simplifies the mounting of the device;
  the bearing element or one of the bearing elements is an adjusting screw extending along a longitudinal axis and arranged so as to bring about the pivoting of the optical deflector about a pivoting axis; the adjusting screw thus makes it possible to adjust the position of the optical deflector; in case of blockage, the flexibility of the bracing element makes it possible to limit, even avoid, the degradations to the toothed part or to the adjusting screw;
  the optical deflector comprises a deflection part intended to deflect light rays emitted by the light source and a toothed part cooperating with a threaded portion of the adjusting screw; this is a simple means of ensuring the cooperation of the adjusting screw and of the optical deflector;
  the optical deflector and the adjusting screw are arranged so that the adjusting screw is free to rotate about its longitudinal axis and that the rotation of the adjusting screw in one direction or in the other brings about the pivoting of the deflection part about the pivoting axis, notably horizontal and/or transverse; it is a simple and direct means of bringing about the pivoting;

according to the paragraph above, the adjusting screw can also be locked in translation; it thus operates according to the principle of a worm screw; that allows for a more compact actuation compared to screws that are displaced in translation;

the toothed part is a toothed wheel segment; this is a simple embodiment;

the toothed wheel segment is centered on a pivoting axis of the optical deflector; that allows for a rotation with lesser loads on the adjusting screw;

the toothed wheel segment forms an arm the toothed wheel segment forms an arm aligned with the threaded portion and the corresponding contact portion; the load on the optical deflector is thus transmitted directly to the bracing element;

the optical deflector and the adjusting screw are arranged so as to allow the pivoting of the optical deflector between two extreme positions, the optical deflector coming into abutment on a disengaging abutment at least in one of these extreme positions; that makes it possible to limit the travel of the optical deflector; this disengaging abutment can be formed on the support of the optical deflector or on the housing;

the optical deflector and the adjusting screw are arranged so that, when the optical deflector bears against the disengaging abutment, the threaded portion exerts a thrust on the toothed part such that the optical deflector is displaced in the direction of flexing and the bracing element, bringing about and/or increasing the flexing of the bracing element; that makes it possible to improve the absorption of the corresponding load, and therefore avoid wear, even degradation, of the adjusting screw or of the optical deflector;

the bracing element is arranged so as to be able to flex until the toothed part disengages from the adjusting screw; thus, there is no limit on the load exerted on the optical deflector and on the adjusting screw, since, beyond a certain threshold, the toothed part disengages; because of the elasticity of the bracing element, a return force is generated; thus, immediately after the toothed part has disengaged, it is returned toward the adjusting screw to once again mesh therewith;

the bracing element and the contact portion or portions are interference-fitted so that the bracing element is elastically prestressed in the direction of flexing; that makes it possible to ensure pinning against the bearing element; in the case where the latter is an adjusting screw, that makes it possible to keep the toothed part and the adjusting screw meshed and/or confer a certain resistance before the disengagement of the adjusting screw; in the case where the bearing element is the support of the optical deflector, that improves the holding in correct position thereof;

the bearing element or one of the bearing elements is a support of the optical deflector, the latter being intended to support the light source; the dimension chain is thus reduced; notably, the optical deflector bears directly against the light source support;

the deflection part and the part or parts of the optical deflector bearing directly against the support of the light source are made of a single piece of material; the dimension chain is further improved;

the support of the optical deflector is a heat dissipator, notably a heat sink; the compactness is improved by making it possible to discharge the heat generated by the light source;

the heat dissipator is arranged to be in thermal conduction with the light source; the discharging of the heat generated by the light source is thus improved, notably when the latter comprises a photo-emissive semiconductor element;

the optical deflector comprises a deflection part for the light rays emitted by the light source and a first mobile articulation part articulated between a first fixed articulation part and a second fixed articulation part, a first contact portion forming the second fixed articulation part and the support of the optical deflector comprising the first fixed articulation part; the optical deflector is thus articulated and mobile between the light source support and the bracing element with a limited number of pieces; that makes it possible to adjust the position of the light beam; the bracing element makes it possible to keep the optical deflector pinned against the support of the light source, while allowing the articulation of the optical deflector, including in the case of direct contact between, on one side, the contact portion and, on the other, the support of the light source;

the optical deflector comprises a deflection part for the light rays emitted by the light source and a second mobile articulation part articulated between a third fixed articulation part and a fourth fixed articulation part, a second contact portion forming the fourth fixed articulation part and the support of the optical deflector comprising the third fixed articulation part, the first and the second mobile articulation parts being distributed on either side of the optical deflection part along a pivoting axis of the optical deflector; the support of the optical deflector is thus reinforced; the bracing element has in this case at least two contact portions as described previously;

the first and second fixed articulation parts are offset in a direction parallel to the pivoting axis of the optical deflector;

the optical deflector has a toothed part cooperating with a threaded portion of an adjusting screw, notably that previously described, this toothed part being arranged between the first fixed articulation part and the second fixed articulation part; that reinforces the holding in position of the toothed part;

the third and fourth fixed articulation parts are offset transversely along the pivot axis; that reinforces the stability of the assembly;

the bracing element comprises elastic fitting fixing means fitted in the light device and arranged so as to hold the pinned bracing element against the optical deflector; the bracing element can thus be fixed simply against the optical deflector simply by pinning;

the elastic fitting fixing means are arranged so as to be fitted in the direction of flexing; that makes it possible to improve the pinning according to the option of the preceding paragraph;

the bearing element or one of the bearing elements is a support of the optical deflector, the support of the optical deflector comprising complementary fitting means with which the elastic fitting fixing means are fitted; the assembling of the pinning element, of the optical deflector and of its support is simplified;

at least the bracing element is made of polycarbonate; that allows for a good flexibility thereof;

the light device comprises the light source; in this case, the light device is ready to emit a light beam as soon as it is powered with electricity;

the light source comprises a photo-emitting element, notably the light source is a light-emitting diode, also called LED; the present invention is particularly useful in the context of a light device with such a light source; in effect, since the photo-emitting element is of very small size compared to the conventional filament lamps, the plays and imprecisions have more impact;

the optical deflector is in direct link on one side against the pinning element and/or on the other side against the bearing element;

the optical deflector is a lens; in particular, a lens arranged so as to produce, by projection, an image of the light source;

the light device comprises a housing and a closing outer lens closing a front opening of the housing and transparent to allow the light rays emitted by said light device to pass;

the adjusting screw is fixedly mounted in translation and free in rotation in the housing;

the support of the optical deflector is fixed in and to the housing; in particular, it can be fixed directly to the housing walls, which simplifies the mounting of the device;

the housing has a cylindrical portion inside which the or at least one of the bearing elements, the optical deflector, and the pinning element, are stacked in this order, in a direction parallel to the axis of the cylindrical portion; the result is a simplified assembly of the light device, all the more advantageous when the light device is a foglight, notably intended to be mounted in the front bumper of the vehicle;

the optical deflector is arranged so as to deflect the light rays so as to form a lighting beam having a cutoff line; the accuracy of the device according to the invention is all the more useful in this case, because the cutoff line must be positioned accurately to avoid dazzling the drivers of the vehicles coming in the opposite direction or followed by a vehicle equipped with a light device according to the invention;

the light device is a foglight, the optical deflector being arranged so as to deflect the light rays so as to form a fog beam having a horizontal cutoff line.

Another subject of the invention is a vehicle comprising a light device according to the invention.

Other features and advantages of the invention will become apparent on reading the detailed description of the following nonlimiting examples, for the understanding of which reference will be made to the attached drawings, in which.

Figure 8:
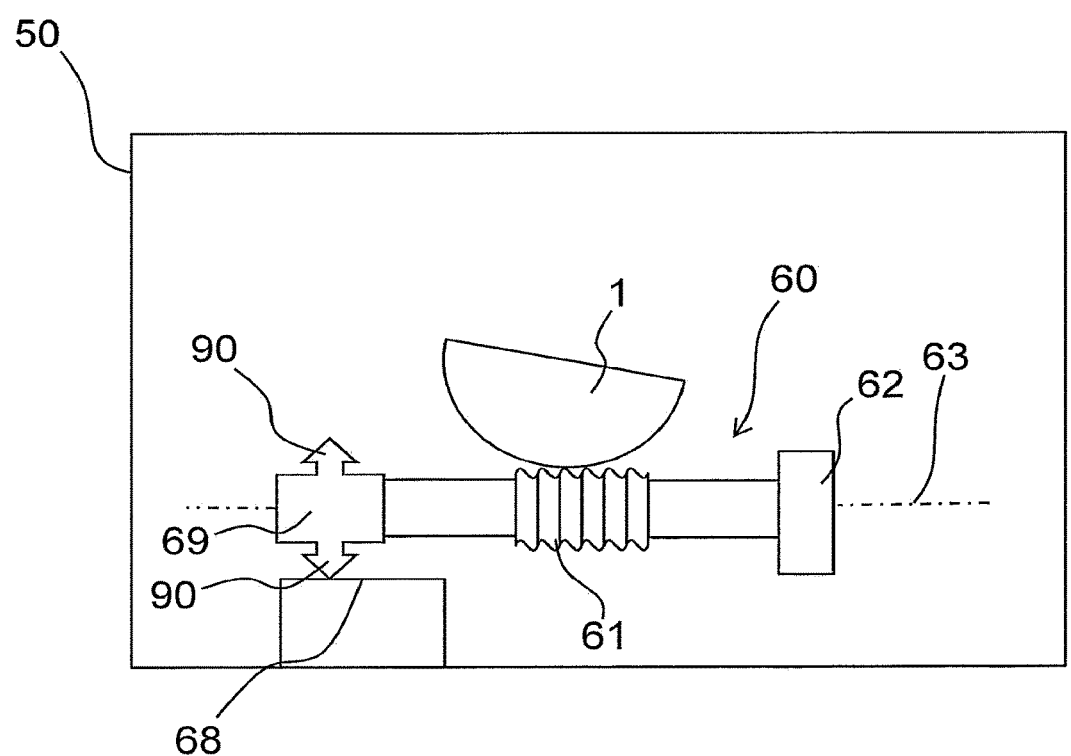

FIG. 8 schematically represents a principle of the invention.

FIG. 8 illustrates an adjusting screw 60 and a device according to the invention in its general principle.

This device here comprises a housing 50 inside which an adjustable piece 1 is enclosed. The orientation of this piece requires, for this device, to be adjusted. For that, an adjusting screw 60 cooperates with this adjustable piece 1 so as to modify its orientation.

The adjusting screw 60 extends along a longitudinal axis about which it is driven in rotation, upon the implementation of an actuation means 62.

This adjusting screw 60 is notably arranged so as to mesh with the adjustable piece 1. The adjusting screw 60 for that comprises a threaded portion 61, which meshes in complementary forms arranged on the adjustable piece 1, these complementary forms not being represented in FIG. 8.

The adjusting screw 60 also comprises a bearing portion 69 which is situated on one side of the threaded portion 61 along the longitudinal axis 63 of the screw, for example at one of the ends of the adjusting screw 60 which is opposite the end bearing the actuation means 62. This bearing portion 69 is provided with elastic means 90 capable of being compressed in a direction transversal to the longitudinal axis 63 of the screw. In FIG. 8, this transverse direction is in the plane of the figure and at right angles to the longitudinal axis 63.

The device comprises a cooperating wall 68 fixed directly or indirectly to the housing 50. One of the elastic means 90, in FIG. 8 the one at the bottom, is arranged between the bearing portion 69 and this cooperating wall 68.

With the way the elements are arranged in this device, the adjustable piece 1, the cooperating wall 68 and the elastic means 90 are arranged so that the one or more elastic means 90 in contact with this cooperating wall 68, here the one at the bottom, are prestressed so as to exert a return force from this threaded portion to the adjustable piece 1.

In the example illustrated, the elastic means 90 is compressed against the cooperating portion 68 and exerts the return force on the bearing portion 69, i.e. upward in this FIG. 8, bringing about the returning of the threaded portion 61 against the adjustable piece 1.

According to a variant not represented, the elastic means 90 can be borne by the cooperating wall instead of the bearing portion 69. They are then compressed against the bearing portion 69, and bringing about the returning of the threaded portion 61 against the adjustable piece 1.

This principle is applicable to different devices comprising at least one adjustable piece and to different adjusting screws suited to such a device.

In particular, this principle can be applied to a vehicle light device, notably a foglight, as will be explained hereinbelow.

The adjustable piece can be an optical deflector, such as a lens, a reflector, a combination of lenses, a combination of reflectors, or a combination of lens(es) and of reflector(s).

Figure 1:
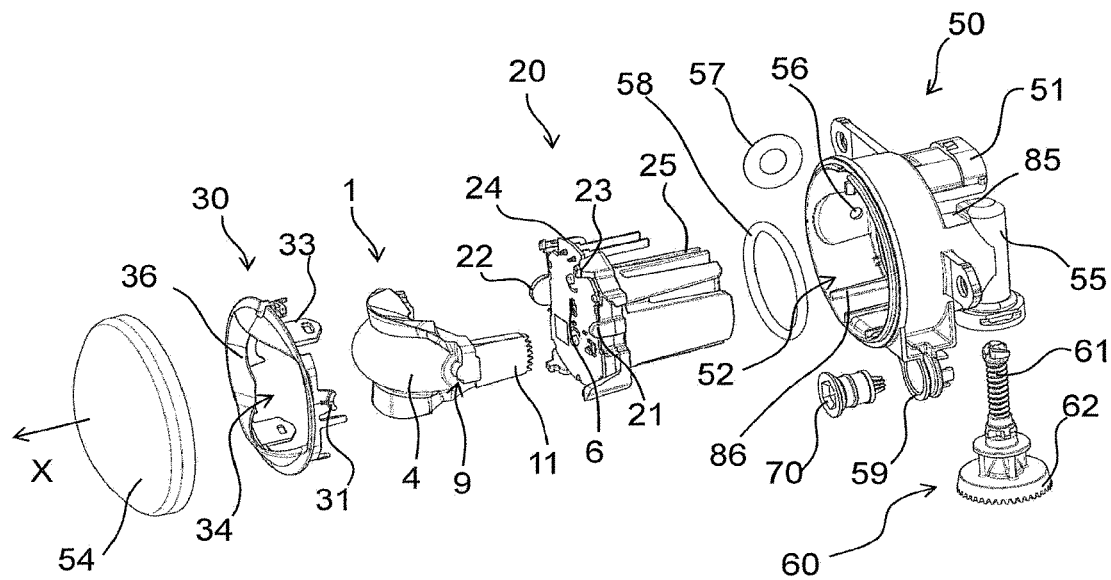
FIG. 1 is a perspective view which shows, in exploded manner, an example of a light device according to the invention.
Figures 2, 3:
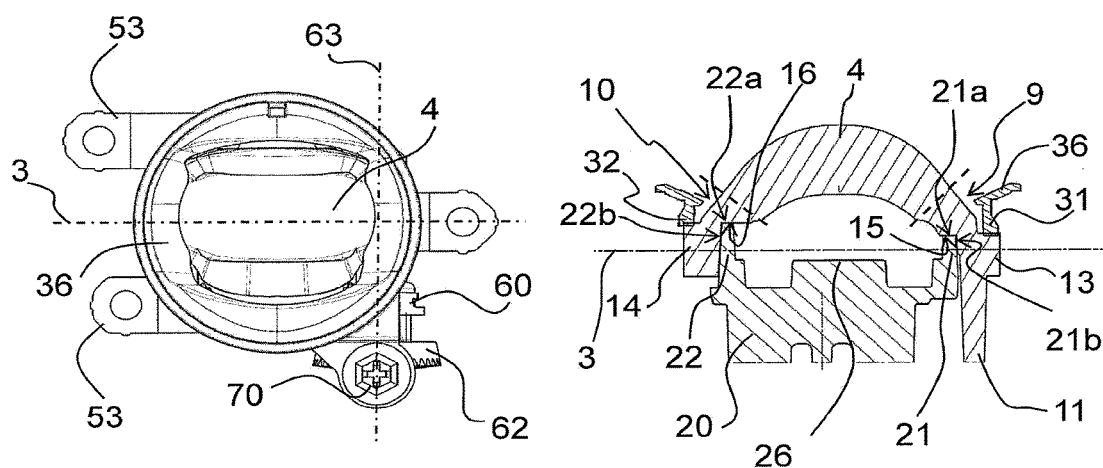
FIG. 2 is a front view of the light device of FIG. 1, illustrated in assembled manner.
FIG. 3 is a cross section of the light device of FIG. 2, in a plane at right angles to the axis 63 and comprising the axis 3.

As illustrated in FIGS. 1 and 2, the light device comprises a housing 50 defining an accommodation inside which are arranged a light source 6 and an optical deflector 1 deflecting the rays emitted by this light source. Conventionally, the light device can comprise a closing outer lens 54 and a style piece or mask 30, situated between the closing outer lens 54 and the optical deflector 1, in the direction of emission X of the light beam by the light device.

The housing 50 comprises a part forming a substantially cylindrical enclosure, defining the accommodation 52. The housing can comprise fixing lugs 53 intended to be fixed to the vehicle.

The light device allows the emission of a light beam that is truncated or at the very least having a very rapid decrease in the brightness emitted below a certain level, the edge of the truncated part or this very rapid decrease corresponding to a cutoff line. For example, the beam is limited under a plane, notably intended to be substantially horizontal and to be located at a certain height above the roadway, once the device is mounted in the vehicle.

In the example illustrated, the device is a headlight generating a fog beam, therefore having a horizontal cutoff line; this headlight is also called foglight or fog headlight.

This device is configured to allow an adjustment of a positioning of the cutoff line of the beam, in a given direction, notably intended to be vertical.

In the example illustrated, the optical deflector is a lens 1, having a deflection part 4, delimited by a rear diopter and a front diopter.

Note that, in the present application, the terms "front" and "rear" are understood in relation to the direction of emission of the light rays by the light device.

The front and rear diopters of the deflection part are arranged so as to produce to deflect the light rays to form the light ray with the cutoff line. According to an exemplary embodiment not illustrated, it is also possible to have diopters bearing striae arranged to deflect the light rays so as to form the cutoff line.

The adjustment of the position of the cutoff line is done by varying the angular positioning of the lens about a pivoting axis, in this example a rotation axis 3.

This rotation axis 3 is intended to be oriented along the transverse axis of the vehicle equipped with the light device.

In this example, to allow this adjustment, the lens 1 also comprises two mobile articulation parts 9 and 10 on either side of the deflection part 4, about which it can turn. In FIG. 3, these mobile articulation parts 9 and 10 are schematically separated from the deflection part 4 by the dotted lines.

The lens 1 also comprises a toothed part 11 cooperating with an adjusting screw 60, the rotation of which about the longitudinal axis 63 of this screw brings about the upward or downward pivoting of the lens 1.

Thus, the adjustment of the cutoff line is performed by an actuation of a single member, namely the lens 1, being used to form and transmit the beam.

The deflection part 4 and the mobile articulation parts 9, 10 are advantageously made of the same material, notably they are made of a single piece of material.

The light source 6 is, in this example, a light-emitting diode, placed upstream of the lens 1 in the direction of emission of the light rays.

The light device comprises a support 20 supporting both this light source 6 and the lens 1. This support is fixed directly to the housing 50. It positions and thus directly fixes the source 6 in the housing 50 relative to the lens.

The cutoff line is obtained here by a mutual arrangement of the lens 1, notably of its front and rear diopters, and of the light source 6, as is known, notably from the documents EP1762776, in particular the embodiments corresponding to FIG. 11 et seq., and/or EP1970619, in particular the embodiment of FIG. 1.

According to this example, the rotation axis 3 passes substantially through the light source 6. The lens 1 will further be able to have a focus at the level of the light source 6. This way, there is a beam available of which the form and the distribution of the light intensities within this form do not vary as a function of the angular positioning of the lens 1 and therefore do not depend on the positioning of the cutoff line.

Figure 5:
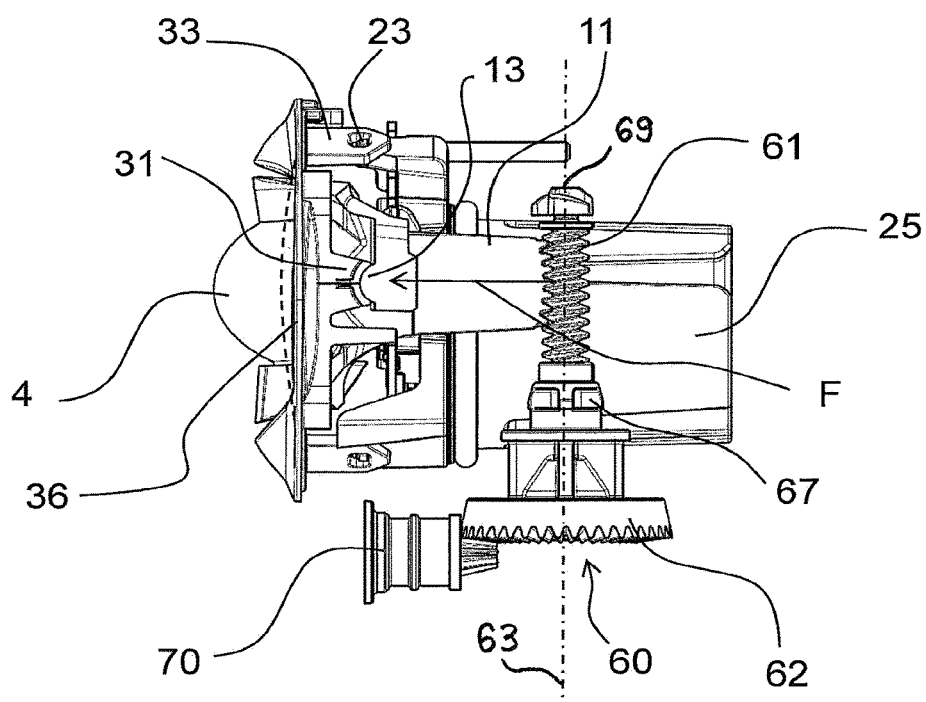
FIG. 5 is a side view of the light device of FIG. 2, without the closing outer lens, or the housing.
Figure 7:
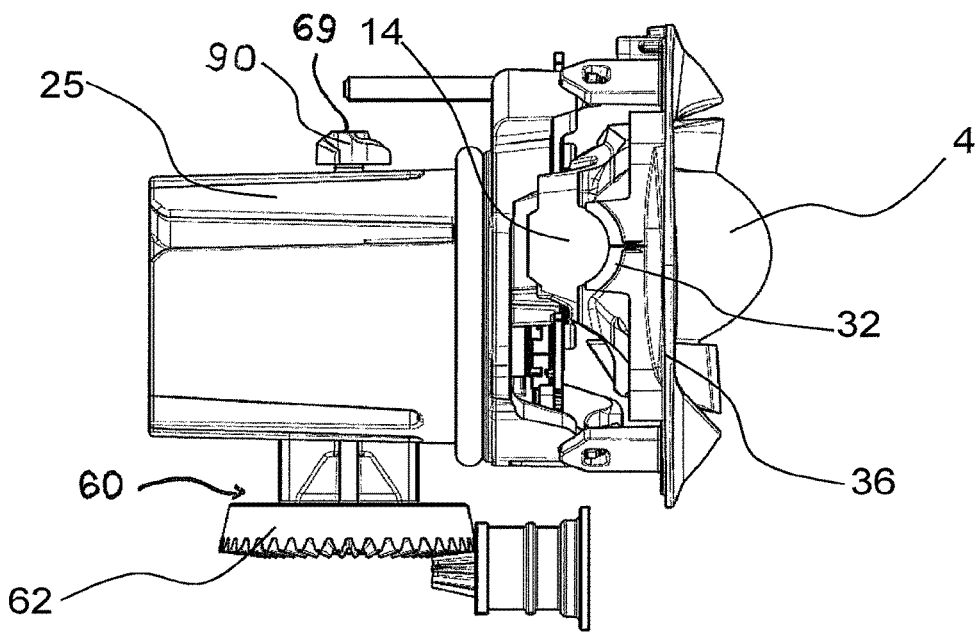
FIG. 7 is a side view of the light device of FIG. 2, without the housing, or the closing outer lens, from the side opposite to that of FIG. 5.

The mask 30, forms a pinning element. As illustrated in FIG. 1, the support 20, the lens 1 and the mask 30 are stacked, in this order, in the housing 50. That done, the mask 30 is fixed to the support 20 via fixing tabs 33 provided with a hole, hooks 23 of the support coming to be clipped into these holes, as can be seen in FIGS. 5 and 7.

By being stacked thus, the mask 30 pins the lens 1 against its support 20, as will be detailed hereinbelow.

The mask 30 has a central opening 34. Once the fog headlight is assembled, the mask 30 surrounds the lens 1, its deflection part 4 being accommodated in the central opening 34. From the outside, seen from the front, practically only this deflection part 4 of the lens 1 and the front face of the mask 30 are visible.

The light source is, in this example, a light-emitting diode or LED 6.

The support 20 here further comprises an electronic control board 24. This board 24 serves, notably, to control the LED 6. Arms 21, 22 of the support 20 extend on either side of this control board 24, along the rotation axis 3.

The support 20 is, in this example, a heat dissipator, having, at the rear, fins 25. This heat dissipator 20 is more particularly in a heat exchange relationship with the LED 6, notably via the electronic board 24.

To promote the heat dissipation and the compactness of the headlight, the bottom wall of the housing 50 comprises, in this example, an opening, not represented, through which the fins 25 pass. The headlight in this case comprises an annular seal 58 in order to ensure a seal-tightness between the support 20 and the wall at the bottom of the housing 50.

The heat dissipator can be made of metal, notably of aluminum, or even of heat-conducting polymer.

The housing 50 can comprise a ventilation device, such as a ventilation hole 56 passing through the lateral wall of the housing 50 and plugged by a semi-permeable membrane 57. That makes it possible to connect the interior of the housing 50 with the outside.

The internal face of the housing 50 can comprise clipping ribs, namely elastic fitting ribs, for fixing the support 20 in the housing 50 by means complementing these ribs.

In this example, the bottom of the housing also comprises a connector 51 for electrically powering the light source 6.

The housing 50 comprises an accommodation volume of the lens 1, the support 20 and the mask 30. The accommodation volume can, as here, be delimited by a cylindrical wall 80 of the housing 50, on which is mounted the closing outer lens 54. The accommodation volume is delimited at the front by this closing outer lens 54 and at the rear by a bottom wall of the housing.

In a nonlimiting manner, this housing 50 has a sleeve 85 extending from the bottom wall of the housing and emerging in a cassette 55 accommodating the adjusting screw 60. This sleeve 85 thus links the accommodation volume and the cassette 55.

The housing 50 also has a protuberance forming a holding ring 59 for a return pinion 70, the longitudinal axis of which is at right angles to that of the adjusting screw 60. The adjusting screw comprises a toothed adjusting wheel 62, the rotation axis of which corresponds to the longitudinal axis 63 of the adjusting screw. The return pinion 70 cooperates with the teeth of the adjusting wheel 62, so that the actuation of the pinion brings about the rotation of the adjusting wheel 62 and therefore of the adjusting screw about the longitudinal axis 63.

Figure 4:
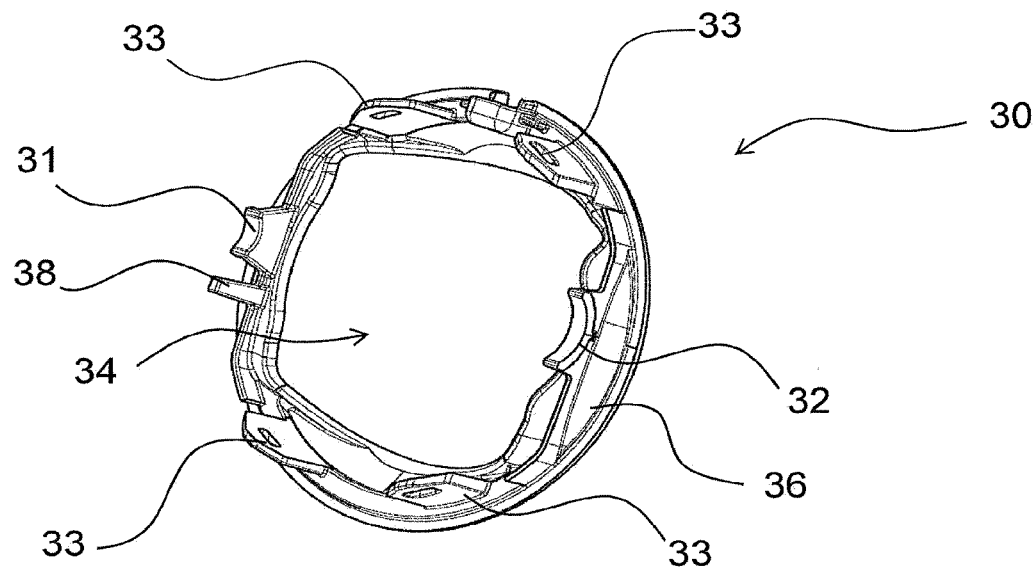
FIG. 4 is a perspective view of the pinning element of the light device of the preceding figures.

This mask 30, illustrated in detail in FIG. 4, comprises a bracing element 36 which forms the trim of this mask. In effect, as can be seen in FIG. 2, the front part of the bracing element 36 forms the part visible from the outside of the light device and makes it possible to mask the bottom of the housing 50.

In this example, the trim 36 totally surrounds the lens 1, once the light device is assembled.

In this example, the mask 30 comprises two contact portions 31 and 32. These are here formed by protuberances extending approximately in the direction of stacking of the elements in the interior of the housing 50. The contact portions 31, 32 are turned toward the rear of the bracing element 36, such that they are not visible from the outside. Once the light device is assembled, the first contact portion 31 and the second contact portion 32 come into contact with outer portions 13 and 12, respectively of the first mobile articulation part 9 and of the second mobile articulation part 10.

As illustrated in FIGS. 1 and 3, the outer portion of the first mobile articulation part 9 and the outer portion of the second mobile articulation part 10 are formed by a first cylindrical portion 13 and a second cylindrical portion 14.

As illustrated in FIG. 3, the arms of the support 20 are formed by disk portions 21, 22, each comprising an edge 21a, 22a, each edge being accommodated in complementary forms, namely concave portions 15, 16 of the lens 1 situated at the rear thereof.

The contact portions 31, 32 are terminated by a concave form complementing the cylindrical portions 13, 14.

Thus, the first mobile articulation part 9 turns easily between the contact portion 31 and the disk portion 21. Similarly, the second mobile articulation part 10 turns easily between the contact portion 32 and the disk portion 22.

The disk portions 21, 22 and the contact portions 31, 32 hold the lens 1 on the one hand on the support 20, and on the other hand free to rotate relative thereto. The disk portions 21, 22 and the contact portions 31, 32 therefore here form fixed articulation parts between which the mobile articulation parts 9, 10 pivot, thus forming two articulations of the lens.

In this example, the concave portions 15, 16 of the lens 1 are situated between the cylindrical portions 13 and 14, along the rotation axis 3. The bracing element 36 thus firmly pins the mobile articulation parts 9, 10 against the support 20.

This offset between the two fixed articulation parts of each articulation, namely the offset along the rotation axis 3 between the corresponding cylindrical portion 13, 14 and the corresponding concave portion 15, 16, makes it possible to more easily produce the lens 1 with an arm extending toward the rear, this arm forming a toothed segment portion 11, which here forms the toothed part cooperating with the adjusting screw 60.

The disk portions 21, 22 have contact faces 21b, 22b, arranged transversely and opposite the light source 6. They form sliding contact bearings, each cooperating with a planar face of the corresponding mobile articulation part 9, 10.

In this example, these planar faces and these contact faces 21b, 22b are inclined inward, namely toward the space contained between each articulation of the lens 1. That allows for a better stacking of the lens 1 with its support 20 on the housing 50, the mobile articulation parts 9, 10 being placed on either side of the cylindrical portions 21 and 22.

As illustrated in FIG. 3, the LED 6 can be arranged at the level of the rotation axis 3. Here, the support 20 comprises an offset toward the front allowing the positioning of the board 24, not represented in this figure, and of the LED 6, so that the photo-emissive element thereof runs at the level of the rotation axis 3.

As illustrated in FIGS. 5 and 7, the mask is clipped onto the support 20 and the contact portion 31 is in contact with the cylindrical part 9, thus bearing thereon. The housing has not been represented for reasons of clarity of the drawing.

The toothed wheel segment 11 bears on the adjusting screw 60. In particular, the teeth of the toothed wheel segment 11 are meshed with the threaded portion 61 of the adjusting screw 60. Because of this, depending on the direction of rotation of the adjusting screw 60, the toothed wheel segment 11 tilts upward or downward, bringing about the adjustment of the deflection part 4 respectively downward or upward.

Thus, the displacement of the projected image of the LED 6 and therefore of the corresponding light beam is assured. Notably, in the context of a fog beam, the height of its cutoff line can be adjusted.

The mask 30, by being pinned against the lens 1, makes it possible not only to pin the latter against the support 30 but also to pin the toothed wheel segment 11 against the adjusting screw 60.

Thus, in the embodiment exemplified in these figures, the support 20 and the adjusting screw 60 each separately form a bearing portion within the meaning of the invention.

Figure 6:
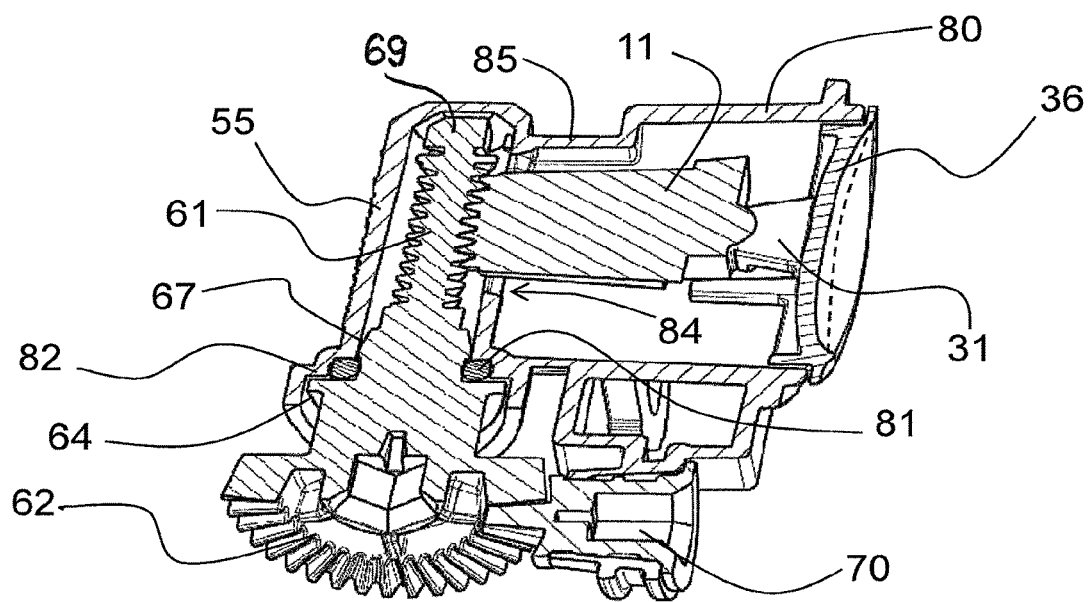
FIG. 6 is a cross section of the light device of FIG. 2, on a plane at right angles to the axis 3 and comprising the axis 63, but without the closing outer lens.

As can be seen in FIG. 6, the arm formed by the toothed wheel segment 11 is arranged between the contact portion 31 and the adjusting screw 60, more particularly its toothed portion 61, in a direction of alignment parallel to that of the direction X of emission of the light beam by the headlight.

In this example, this direction of alignment corresponds to the direction of flexing of the trim 36. The trim 36 is therefore flexible and deformable, preferably elastically deformable on the sides of the mask 30 in the direction of flexing F, as illustrated in FIG. 5, where the dotted lines represents the position of maximum flexing of the trim 36.

When the adjusting screw 60 is actuated, the lens pivots to a certain limit, for example by abutting against the support 30. In such a case, the toothed wheel segment 11 forces on the adjusting screw 60. The arrangement of the toothed wheel segment 11 makes it possible to transfer this load on the adjusting screw 60 to the contact portions 31, 32, which, being rigid, bring about the deformation of the trim 36 in the direction of flexing F. Thus, the teeth of the toothed wheel segment 11 are progressively disengaged from the threaded portion 61, to reach the position of maximum flexing, at which level the teeth of the toothed wheel segment 11 are completely disengaged from the threaded portion 61. There is then disengaging of the lens 1 from the adjusting screw 60.

Immediately once it is disengaged, the elasticity of the trim 36 drives the lens 1, and therefore the toothed wheel segment 11, back toward the rear, bringing the toothed wheel segment 11 back into mesh in the threaded portion 61.

The mask 30 can be mounted in the housing 50 so as to be slightly prestressed on the lens. Here, the interference between the diameter the threading of the threaded portion 61 and of the toothed wheel segment 11 is 3.5 mm. It will therefore be possible to have, on this headlight, a forward displacement of 3 or 5 mm of the toothed wheel segment 11 before the disengaging thereof.

Interference between two parts mounted together is understood to mean that these parts have been brought closer together than they would have been without deformation. The distance between their position of mounting in contact without deformation and the mounted position in deformation corresponds to the interference value.

In this example, the flexibility of the mask 30 also serves to take up play at the level of the articulation of the lens 1.

In effect, in case of play between the mobile articulation parts 9, 10, and the disk portions 21, 22 and the contact portions 31, 32, the flexibility of the mask 30 makes it possible to take up any possible offsets.

According to one embodiment of the invention and in particular in this example, the mask 30, the lens 1 and the support 20 are mounted together so that the contact portions 31, 32 are interfering with the cylindrical portions 13, 14, by 0.2 mm in the direction of flexing F. In other words, once mounted, the trim 36 has a prestress, such that it is, relative to its position without stress, flexed forward by 0.2 mm at its point of maximum flexing. This prestressing makes it possible to further take up the plays.

In the example illustrated, the contact portions 31, 32, the cylindrical portions 13, 14 and the disk portions 21, 22 are smaller on one side of the headlight, here on the side of the toothed part 11, than on the other side of the headlight. That makes it possible to produce polarizers so as to position the mask 30 in the right direction around the lens 1, and also this lens 1 on this support 20.

Also, as here, the mask 30 can comprise a pin 38 protruding from the rear of the trim 36 and extending longitudinally toward the bottom of the housing. This pin 38 and the support 20 are arranged in such a way that the pin 38 can pass to the side of the support only if the lens 1 is placed correctly on the support 20.

As illustrated in FIG. 6, the arm bearing the toothed wheel segment 11 passes through the sleeve 85 and emerges through an opening 84 inside the cassette 55.

The adjusting screw 60 comprises clips 67 arranged against complementary portions not shown in these figures, thus making it possible to prevent the adjusting screw 60 from moving in translation downward. Similarly, the adjusting screw 60 comprises a bearing 64 arranged against a circular wall 82 of the housing 50, so as to prevent the adjusting screw 60 from being displaced in translation upward.

A seal 81 is here arranged between the clips 67 and this bearing 64, so as to ensure the seal-tightness of the housing 54 at the level of the opening allowing the adjusting screw 60 to be mounted. This seal 81 can for example be placed beforehand on the adjusting screw.

In this example, a circular shoulder makes it possible to accommodate the seal 81.

According to one variant embodiment, the adjusting screw 60 can comprise a bearing portion 69 situated on one side of the threaded portion 61 along the longitudinal axis of the adjusting screw, this bearing portion 69 being provided with one or more elastic means 90 capable of being compressed in a direction transversal to the longitudinal axis of the screw. Advantageously, this bearing portion 69 can form one of the ends of the adjusting screw; for example, as is illustrated in FIGS. 1, 5 and 7, the elastic means 90 are borne by the end of the screw opposite the end comprising the adjusting wheel 62. According to one embodiment, the elastic means 90 are thin strips. For example, the thin strips comprise a base linked to the bearing portion 69, this base being arranged radially relative to the longitudinal axis 63 of the adjusting screw 60. The thin strips have a first and a second ends, the first end being the portion of said base linked to the bearing portion 69, the thin strips extending between their said base and their said second end and being bent from their base toward this second end in the same direction. Advantageously, these thin strips are made of a single piece of material with the bearing portion 69. There can for example be three of the thin strips; that makes it possible, whatever the orientation of the adjusting screw 60 according to the position conferred on the lens 1, for there always to be at least one thin strip compressed against an internal wall of the cassette 55 forming the cooperating portion 68.

In this variant embodiment, the adjusting screw 60, the optical deflector 1 and the bracing element 36 are arranged so that the prestressing of the bracing element is sufficient to bring about a prestressing on the adjusting screw, such that all elastic means being behind the adjusting screw exhibits a stress greater than the one or more elastic means at the front of this adjusting screw; thus, the taking up of the plays is essentially realized by the elastic means 90 of the adjusting screw, the flexibility of the bracing element being essentially implemented to absorb the loads on the optical deflector when the latter is set at the end of travel, in particular to allow the disengaging of the optical deflector from the adjusting screw.

The headlight can be mounted in the following manner. Initially:

the adjusting screw 60 is clipped into the adjusting cassette 55,
the lens 1 is mounted on its support 20 and the mask 30 is clipped onto the support and around the lens 1, thus pinning the lens 1 against the support 20.

Next, the mask/lens/support assembly is slid into the housing 50, the toothed wheel segment 11 passing through the opening of the partition which separates the sleeve 85 from the cassette 55.

According to one embodiment of the invention and as in the example illustrated, the mask 30 and/or the support 20, as well as the housing 50, are here arranged so as to bring about the positioning of the mask/lens/support assembly in the housing 50. In particular, guiding rails 84 make it possible to guide the sliding of the support 20 in the housing 50, so as to facilitate the passage of the toothed wheel segment 11 through the opening in the partition separating the cassette 55 from the sleeve 85, and the meshing with the adjusting screw 60.

Next, the angular member 70 can be mounted in the holding ring 59, then the headlight can be closed by the closing outer lens 54.

When molding the mask 30, it is possible to use two key-forms with mold-stripping performed by separation in a direction corresponding approximately to the future direction of emission X of the light beam by the headlight. These key-forms comprise hollows, or imprints, making it possible to produce the faces of the trim 36 and its central opening 34, as well as the contact portions 31, 32 and the fixing tabs 33.

To produce the holes of the fixing tabs 33, it is possible to use two slides being withdrawn for the mold-stripping in a different direction, notably at right angles to the direction of separation of the key-forms.

The present invention is particularly advantageous in the context of a fog headlight. However, it could be applied to other light devices.

For example, to light devices with a lens in rotation about a vertical axis to produce a mobile part of a light beam, notably a first beam with an oblique or vertical cutoff line, this first beam being intended to be combined with a beam with a horizontal cutoff line.

According to one embodiment of the invention, this combination can be applied to a light device according to the invention generating an elementary light beam with an oblique or vertical cutoff intended to be combined with a second elementary beam with the horizontal cutoff line. The beam with oblique cutoff being displaced horizontally by actuation of the optical deflector, for example as a function of the turns made by the vehicle equipped with the light device or even as a function of the oncoming vehicles.

The invention claimed is:

1. Motor vehicle light device intended to comprise a light source, said light device comprising:
    an optical deflector arranged to deflect the light rays emitted by the light source,
    at least one bearing element,
    a pinning element comprising a bracing element and at least one contact portion borne by the bracing element, the bracing element at least partially surrounding the optical deflector and includes an offset region between a linear edge of the respective contact portion and a circular periphery of the pinning element, said contact portion bearing against the optical deflector,
    the optical deflector, said bearing element and said pinning element being arranged so that the optical deflector is at least partially gripped between said bearing element and said contact portion, and so that, in a direction passing through said contact portion, called direction of flexing (F), said contact portion is rigid and the bracing element is elastically deformable in the offset region.

2. Light device according to claim 1, wherein the pinning element is a mask placed in front of the bearing element in the direction of emission (X) of the light beam by said light device.

3. Device according to claim 2, wherein the bracing element is a trim of the mask, the trim being visible from the outside of said light device and having a central opening through which the light rays emitted by the light source passes, after or before deflection by the optical deflector.

4. Light device according to claim 2, wherein the bearing element or one of the bearing elements is an adjusting screw extending along a longitudinal axis and arranged so as to bring about the pivoting of the optical deflector about a pivoting axis.

5. Light device according to claim 2, wherein the bracing element and the contact portion or portions are interference-fitted so that the bracing element is elastically prestressed in said direction of flexing (F).

6. Light device according to claim 2, wherein the bearing element or one of the bearing elements is a support of the optical deflector.

7. Light device according to claim 1, wherein the bearing element or one of the bearing elements is an adjusting screw extending along a longitudinal axis and arranged so as to bring about the pivoting of the optical deflector about a pivoting axis.

8. Light device according to claim 7, wherein the optical deflector comprises a deflection part intended to deflect light rays emitted by the light source and a toothed part cooperating with a threaded portion of the adjusting screw.

9. Light device according to claim 8, wherein the toothed part is a toothed wheel segment.

10. Light device according to claim 9, wherein the toothed wheel segment forms an arm aligned with the threaded portion and the corresponding contact portion.

11. Light device according to claim 8, wherein the optical deflector and the adjusting screw are arranged so as to allow the pivoting of the optical deflector between two extreme positions, the optical deflector coming into abutment on a disengaging abutment at least in one of these extreme positions, and
    wherein the optical deflector and the adjusting screw are arranged so that, when the optical deflector bears against the disengaging abutment, the threaded portion exerts a thrust on the toothed part such that the optical deflector is displaced in the direction of flexing (F), bringing about and/or increasing the flexing of the bracing element.

12. Light device according to claim 11, wherein the bracing element is arranged so as to be able to flex until the toothed part disengages from the adjusting screw.

13. Light device according to claim 1, wherein the bracing element and the contact portion or portions are interference-fitted so that the bracing element is elastically prestressed in said direction of flexing (F).

14. Light device according to claim 1, wherein the bracing element comprises elastic fitting fixing means fitted in the light device and arranged so as to hold the pinned bracing element against the optical deflector, and in which the bearing element or one of the bearing elements is a support of the optical deflector, the support of the optical deflector comprising complementary fitting means with which the elastic fitting fixing means are fitted.

15. Light device according to claim 1, this light device being a foglight, wherein the optical deflector is arranged so as to reflect the light rays so as to form a fog beam having a horizontal cutoff line.

16. Light device according to claim 1, wherein the bearing element or one of the bearing elements is a support of the optical deflector.

17. Light device according to claim 16, wherein the support of the optical deflector is intended to support the light source.

18. Light device according to claim 16, wherein the optical deflector comprises a deflection part of the light rays emitted by the light source and a first mobile articulation part articulated between a first fixed articulation part and a second fixed articulation part, a first contact portion forming the second fixed articulation part and the support of the optical deflector comprising the first fixed articulation part.

19. Light device according to claim 18, wherein the first and second fixed articulation parts are offset in a direction parallel to the pivoting axis of the optical deflector, and in which the optical deflector has a toothed part cooperating with a threaded portion of an adjusting screw, said toothed part being arranged between the first fixed articulation part and the second fixed articulation part.

20. Light device according to claim 17, wherein the optical deflector comprises a deflection part of the light rays emitted by the light source and a first mobile articulation part articulated between a first fixed articulation part and a second fixed articulation part, a first contact portion forming the second fixed articulation part and the support of the optical deflector comprising the first fixed articulation part.

* * * * *